United States Patent Office 3,135,774
Patented June 2, 1964

3,135,774
PROCESS FOR PREPARING 16β-METHYL
PREDNISONE
Giangiacomo Nathansohn, Milan, Italy, and Emilio Testa, Ticino Canton, Switzerland, assignors to Lepetit S.p.A., Milan, Italy
No Drawing. Filed Jan. 26, 1962, Ser. No. 169,111
Claims priority, application Great Britain Feb. 16, 1961
2 Claims. (Cl. 260—397.45)

The present invention is concerned with a new process for preparing 16β-methyl prednisone or 16β-methyl-pregna-1,4-diene-17α,21-diol-3,11,20-trione and its 21-acetate.

16β-methylprednisone is a known steroid, its preparation and its pharmacological activity being described in Journal of the American Chemical Society, 80, 4428 and 4435 (1958); 82, 4012 (1960) and in Annals of New York Academy of Sciences 82, 829 (1959).

The known processes, however, are based on chemical reactions starting from expensive raw materials and operating with low yields. The high cost of the final product has till now limited its practical therapeutical use.

Particularly, 5β-pregn-16-en-3α-ol-11,20-dione-3-acetate has been described as a starting product. It was prepared starting from 5β-pregnane-3α,17α,21-triol-11,20-dione-3, 21-diacetate, a steroid which already contains the 17α-hydroxy and 21-acetoxy groups. These groups however must be first removed to prepare 5β-pregn-16-en-3α-ol-11, 21-dione-3α-acetate, in which the same groups must be subsequently reintroduced to build up the structure of 16β-methylprednisone.

5β - pregnane-3α,17α,21-triol-11,20-dione - 3,21 - diacetate is obtained in turn from bile acids, the side chain of which can be degraded only through several expensive steps and with low yields.

It has now been found that 16-methyl-5α-pregn-16-en-3β-ol-11,20-dione-3β-acetate may advantageously be used as starting compound in the production of 16β-methyl prednisone. It can be easily obtained in good yields from steroids of plant origin as described, for example, in Farmaco 16, 58 (1961). This product has never been used as starting material owing to the difficulty of introducing an hydroxyl group in the 17α-position of an 11-keto-5α-pregnane already containing a methyl at position 16. This difficulty is due to the different reactivity of 5α- and 5β-pregnanes, as described, for example, in Helv. Chim. Acta 42, 2045 (1959) and Chem. and Industry, 1959, 444. Such a transformation has not hitherto been carried out on 5α-pregnanes with satisfactory yields.

The invention resides in introducing an hydroxyl into the 17α-position of the starting compouund 16-methyl-5α-pregn-16-en-3β-ol-11,20-dione-3β-acetate, by converting this compound into its 16α,17α-epoxide and heating the epoxide with p-toluensulphonic acid in an inert solvent to obtain 16-methylene-5α-pregnane-3β-17α-diol-11,20-dione, which on mild reduction with hydrogen surprisingly yields 16β-methyl-5α-pregnane - 3β,17α - diol-11,20-dione which is practically free from the 16α-isomer. This last mentioned compound can be converted to the desired product 16β-methylprednisone or its 21-acetate by a number of successive steps.

The production of 16β-methyl prednisone or its 21-acylate may, in accordance with the invention, proceed as follows:

16-methyl - 5α - pregn-16-en-3β-ol-11,20 - dione - 3β-acetate (I) is converted into its 16α,17α-epoxide (II) by treatment with hydrogen peroxide in an alcoholic aqueous alkaline solution at room temperature for 15–20 hours; the resulting epoxide is heated with p-toluene-sulphonic acid in an inert solvent, for example, benzene, at the boiling temperature of the solvent for 2–3 hours to obtain 16-methylene-5α-pregnane-3β,17α-diol-11,20-dione (III).

This compound (III) is converted, by mild reduction with hydrogen, using palladium absorbed on an earth alkali metal carbonate as a catalyst, in an inert organic solvent, to 16β-methyl-5α-pregnane-3β,17α-diol-11,20-dione (IV), which is practically free from 16α-isomer.

The 16β-methyl-5α-pregnane-3β,17α-diol-11,20-dione is converted into 16β-methyl-5α-pregnane-3β,17α,21-triol-11, 20-dione-21-acetate (VI) by treatment with bromine in an inert organic solvent at room temperature, evaporation of the solvent to dryness, and refluxing the crude 21-bromo-derivative (V) for 15–18 hours with potassium acetate in aqueous acetone.

By oxidation of compound (VI) with a sulphuric acid solution of chromic acid in acetone 16β-methyl-5α-pregnane-17α,21-diol-3,11,20-trione-21-acetate (VII) is obtained. This latter, through the 2,4-dibromo derivative (VIII) obtained by treatment with bromine in acetic acid, gives the final product by dehydrobromination with a mixture of lithium bromide and lithium carbonate in dimethylformamide.

The final product, i.e. 16β-methylprednisone-21-acetate (IX) can be hydrolysed in known manner to obtain 16β-methylprednisone.

The reactions described above are schematically illustrated below.

Yields are given to show the industrial importance of the procedure, which enables the production of 16β-methylprednisone, a product of great importance for human therapy, in good amounts and in a high degree of purity.

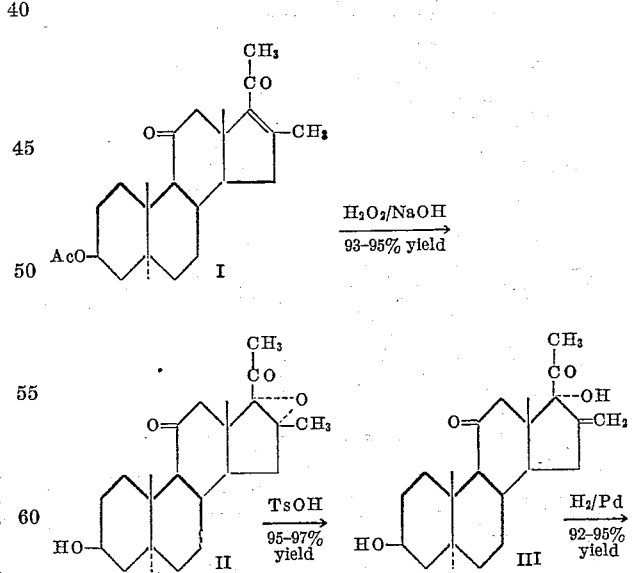

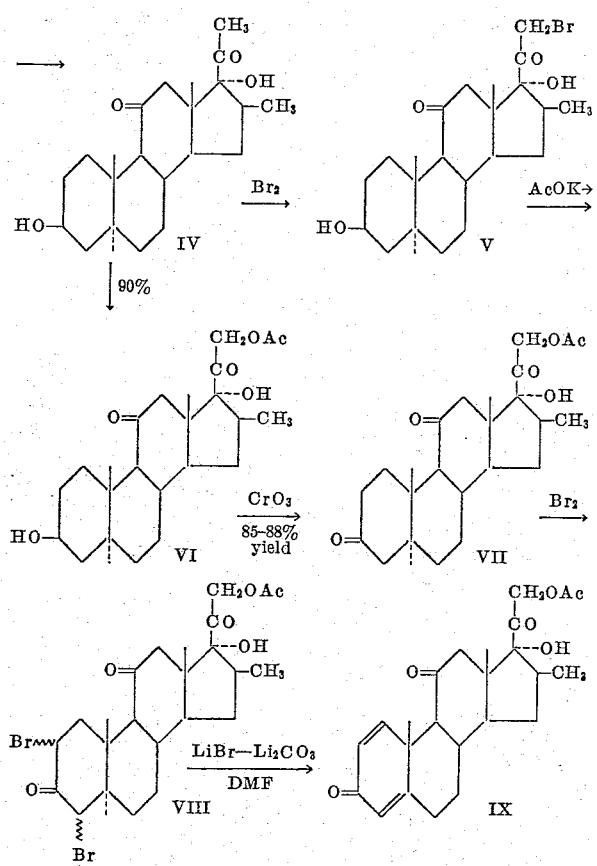

The following example illustrates the invention.

Example

To a solution of 29.7 g. of 16-methyl-5α-pregn-16-en-3β-ol-11,20-dione-3β-acetate in 1000 ml. of methanol, 120 ml. of a 30% hydrogen peroxide solution and a solution of 13 g. of sodium hydroxide in 120 ml. of water are added, taking care that the temperature does not exceed 20° C. After 1.5 hours at 30° C. and 15 hours at 20–25° C. under stirring the mixture is diluted with 1000 ml. of a saturated saline solution, then it is cooled to 0° C. and the precipitate is collected in vacuo. The resulting solid is dissolved in benzene, the solution is dried and diluted with an equal volume of petroleum ether. The precipitate is collected and dried. Yield 26.2 g. (94.8%) of 16β-methyl-16α,17α-epoxy-5α-pregnane-3β-ol-11,20-dione; M.P. 178–183° C. $[\alpha]_D$ +88.2° (c. 1, CHCl₃); $[\alpha]_D$ +82° (c. 1, dioxane).

A mixture of 25 g. of 16β-methyl-16α,17α-epoxy-5α-pregnane-3β-ol-11,20-dione, 0.6 g. of p-toluenesulphonic acid and 500 ml. of anhydrous benzene is refluxed for 2 hours. Then it is cooled and the precipitated 16-methylene - 5α - pregnane-3β,17α-diol-11,20-dione is collected. Yield 24.1 g. (96.5%); M.P. 226–230° C. Although a sample recrystallized from methanol melts at 273–278° C., the product is sufficiently pure for the subsequent step. $[\alpha]_D$ −10.2° (c. 1, CH₃OH/CHCl₃ 1:1).

To a solution, obtained by warming and subsequent cooling of 12 g. of 16-methylene-5α-pregnane-3β,17α-diol-11,20-dione in 1000 ml. of anhydrous methanol a suspension of 3.6 g. of 5% Pd/CaCO₃ in 200 ml. of anhydrous methanol is added, then it is hydrogenated till no more hydrogen is absorbed.

The catalyst is filtered off and the filtrate is concentrated to about 200 ml. On cooling 16β-methyl-5α-pregnane-3β,17α-diol-11,20-dione precipitates and is collected and dried. Yield 11.3 g. (94%); M.P. 227–230° C. $[\alpha]_D$ +66.7° (c. 0.527, dioxane).

To a suspension of 10 g. of 16β-methyl-5α-pregnane-3β,17α-diol-11,20-dione in 700 ml. of anhydrous chloroform containing 1% ethanol 47.6 g. of a 9.58% bromine solution in anhydrous chloroform are gradually added; the reaction is started by the addition of some millilitres of a hydrogen bromide solution in chloroform. At the end of the addition the solution is made neutral by adding sodium bicarbonate, then it is filtered and concentrated to dryness in vacuo.

The residual crude 21-bromo derivative is refluxed for 18 hours with 200 ml. of acetone, 16.5 g. of anhydrous potassium acetate and 16.5 g. of water. The mixture is distilled down to one half its volume, 1000 ml. of water are added and the precipitate is collected. Yield 10.5 g. (90%) of 16β-methyl-5α-pregnane-3α,17α,21-triol-11,20-dione-21-acetate; M.P. 220–225° C.

A solution of 16 g. of 16β-methyl-5α-pregnane-3β,17α,21-triol-11,20-dione-21-acetate in 1600 ml. acetone is oxidized with 16 ml. of an 8 N chromic acid solution in sulphuric acid (prepared according to J. Chem. Soc. 1953, 2555) under stirring at 5° C.

At the end of the addition the solution is diluted with water to about 1000 ml. and the crystalline precipitate of 16β-methyl-5α-pregnane - 17α,21 - diol-3,11,20-trione-21-acetate is collected. Yield 15 g.; M.P. 218–223° C. (from acetone); $[\alpha]_D$ +120.4° (c. 0.628, dioxane).

A solution of 12 g. of 16β-methyl-5α-pregnane-17α,21-diol-3,11,20-trione-21-acetate in 100 ml. of dioxane containing 3 ml. of acetic acid is brominated with a solution of 2.9 g. of bromine in 25 ml. of acetic acid at 12–15° C. At the end of the addition the mixture is stirred for 90 minutes, poured into 500 ml. of ice water containing 6.2 g. of sodium acetate, stirred again for 30 minutes and filtered. The 2,4-dibromo derivative collected on the filter is sufficiently pure for the subsequent step, M.P. 130–140° C. (dec.); Br percent found 27.56; calcd. 27.74.

The 2,4-dibromo derivative is refluxed in 250 ml. of dimethylformamide under a nitrogen atmosphere with 7 g. of lithium bromide and 7 g. of lithium carbonate for 1 hour. The solution is then concentrated to ⅓ its volume, cooled and poured into 500 ml. of ice water containing 30 ml. of concentrated hydrochloric acid. The precipitate is dried, dissolved in chloroform and percolated through 5 times its weight of Florisil. The chloroform solution is evaporated to dryness and the residue taken up with 5 ml. of acetone. The insoluble portion is 16β-methylprednisone-21-acetate (7 g.), M.P. 220–228° C. By recrystallization from ethyl acetate or acetone the M.P. rises to 228–230° C.; $[\alpha]_D$ +218° (c. 1, CHCl₃);

$$\lambda_{max}^{MeOH}\ 238\ m\mu\ (\epsilon=15{,}000)$$

We claim:

1. A process for preparing 16β-methylprednisone 21-acetate, which comprises contacting at room temperature 16-methyl-5α-pregn-16-ene-3β-ol-11,20 - dione 3β-acetate with hydrogen peroxide in the presence of an alkali metal hydroxide in a mixture of water and a lower aliphatic alcohol, heating the formed 16β-methyl-16α,17α-epoxy-5α-pregnane-3β-ol-11,20-dione with p-toluenesulfonic acid in an anhydrous inert organic solvent at the boiling temperature of said solvent, hydrogenating the obtained 16-methylene-5α-pregnane-3β,17α-diol-11,20-dione in the presence of palladium absorbed on an earth alkali metal carbonate in an anhydrous inert organic solvent, adding bromine to a solution of the formed 16β-methyl-5α-pregnane-3β,17α-diol-11,20-dione in an inert organic solvent, evaporating the solvent to dryness and refluxing the residue with potassium acetate in a water-acetone mixture, oxidizing the obtained 16β-methyl-5α-pregnane-3β,17α,21-triol-11,20-dione 21-acetate with a chromium trioxide solution in sulfuric acid, converting the formed 16β-methyl-5α-pregnane-17α,21-diol-3,11,20-trione 21-acetate into the 2,4-dibromo derivative by treatment with bromine in acetic acid, and refluxing the 2,4-dibromo derivative with a mixture of lithium bromide and lithium carbonate in dimethylformamide.

2. A process for preparing 16β-methyl-5α-pregnane-3β, 17α-diol-11,20-dione which comprises contacting at a temperature of 15–30° C. 16-methyl-5α-pregn-16-ene-3β-ol-11,20-dione 3β-acetate with hydrogen peroxide in the presence of sodium hydroxide in a water-methanol mixture, refluxing the formed 16β-methyl-16α,17α-epoxy-5α-pregnane-3β-ol-11,20-dione with p-toluenesulphonic acid in anhydrous benzene, and hydrogenating the obtained 16-methylene-5α-pregnane-3β,17α-diol-11,20-dione in the presence of palladium absorbed on calcium carbonate in anhydrous methanol.

References Cited in the file of this patent

Pataki et al.: J.A.C.S. 74, pp. 5615–5616 (1952).